US006644300B1

(12) United States Patent  (10) Patent No.: US 6,644,300 B1
Toribio  (45) Date of Patent: Nov. 11, 2003

(54) PORTABLE BLOWER HEATER/COOLER APPARATUS

(76) Inventor: Ricky V. Toribio, 105 Canterbury Rd., Phillipsburg, NJ (US) 08865

( * ) Notice: Subject to any disclaimer, the term of this patent is extended or adjusted under 35 U.S.C. 154(b) by 0 days.

(21) Appl. No.: 10/251,059

(22) Filed: Sep. 23, 2002

(51) Int. Cl.[7] ................................................. F24H 3/02
(52) U.S. Cl. .............................. 126/110 B; 126/110 D; 126/114; 126/85 R
(58) Field of Search ......................... 126/110 R, 110 D, 126/110 B, 114, 85 R, 86, 202; 431/354; 392/365–367

(56) References Cited

U.S. PATENT DOCUMENTS

| 896,554 A | * | 8/1908 | Kyle ........................... 392/367 |
| 1,798,290 A | * | 3/1931 | Winner et al. ........... 126/110 B |
| 4,103,146 A | * | 7/1978 | Rampe .................... 128/110 D |
| 5,655,055 A | * | 8/1997 | Goldstein et al. ........... 392/367 |

FOREIGN PATENT DOCUMENTS

| GB | 2037418 | * | 7/1980 | ................. 392/367 |

* cited by examiner

Primary Examiner—James C. Yeung

(57) ABSTRACT

A portable blower heater/cooler apparatus for providing 360 degrees of air-forced heat. The portable blower heater/cooler apparatus includes a base housing assembly including a base housing member being mounted upon leg members and having an opening through a top thereof and also having a screen forming a side of the base housing member; and also includes a heater/cooler assembly including a support plate being fastenable over the opening of the base housing member, and also including a plurality of heating/cooling elements being mounted upon the support plate; and further including a cover being fastenably mounted upon the base housing member and over the heater/cooler assembly; and also includes a fan assembly including a motor being fastenably disposed in the base housing member and having a shaft rotatably attached to the motor, and also including impellers being mounted to the shaft for creating flow of air.

7 Claims, 6 Drawing Sheets

PORTABLE BLOWER HEATER/COOLER APPARATUS

BACKGROUND OF THE INVENTION

1. Field of the Invention

The present invention relates to portable blower heaters and more particularly pertains to a new portable blower heater/cooler apparatus for providing 360 degrees of air-forced heat.

2. Description of the Prior Art

The use of portable blower heaters is known in the prior art. More specifically, portable blower heaters heretofore devised and utilized are known to consist basically of familiar, expected and obvious structural configurations, notwithstanding the myriad of designs encompassed by the crowded prior art which have been developed for the fulfillment of countless objectives and requirements.

Known prior art includes U.S. Pat. No. 5,437,001; U.S. Pat. No. 4,109,138; U.S. Pat. No. 3,911,934; U.S. Pat. No. 5,144,757; U.S. Pat. No. 3,786,575; and U.S. Pat. No. Des. 280,011.

While these devices fulfill their respective, particular objectives and requirements, the aforementioned patents do not disclose a new portable blower heater/cooler apparatus. The prior art includes housings, motors, heating elements, and fan blades for providing one-directional heat.

SUMMARY OF THE INVENTION

The general purpose of the present invention, which will be described subsequently in greater detail, is to provide a new portable blower heater/cooler apparatus which has many of the advantages of the portable blower heaters mentioned heretofore and many novel features that result in a new portable blower heater/cooler apparatus which is not anticipated, rendered obvious, suggested, or even implied by any of the prior art portable blower heaters, either alone or in any combination thereof. The present invention includes a base housing assembly including a base housing member being mounted upon leg members and having an opening through a top thereof and also having a screen forming a side of the base housing member; and also includes a heater/cooler assembly including a support plate being fastenable over the opening of the base housing member, and also including a plurality of heating/cooling elements being mounted upon the support plate; and further including a cover being fastenably mounted upon the base housing member and over the heater/cooler assembly; and also includes a fan assembly including a motor being fastenably disposed in the base housing member and having a shaft rotatably attached to the motor, and also including impellers being mounted to the shaft for creating flow of air. None of the prior art includes the combination of the elements of the present invention nor the capability of creating forced heated air 360 degrees and upwardly.

There has thus been outlined, rather broadly, the more important features of the portable blower heater/cooler apparatus in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

It is an object of the present invention to provide a new portable blower heater/cooler apparatus which has many of the advantages of the portable blower heaters mentioned heretofore and many novel features that result in a new portable blower heater/cooler apparatus which is not anticipated, rendered obvious, suggested, or even implied by any of the prior art portable blower heaters, either alone or in any combination thereof.

Still another object of the present invention is to provide a new portable blower heater/cooler apparatus for providing 360 degrees of air-forced heat.

Still yet another object of the present invention is to provide a new portable blower heater/cooler apparatus that is easy and convenient to set up and use.

Even still another object of the present invention is to provide a new portable blower heater/cooler apparatus that provides a more consistent coverage for heating a particular area or room.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be made to the accompanying drawings and descriptive matter in which there are illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
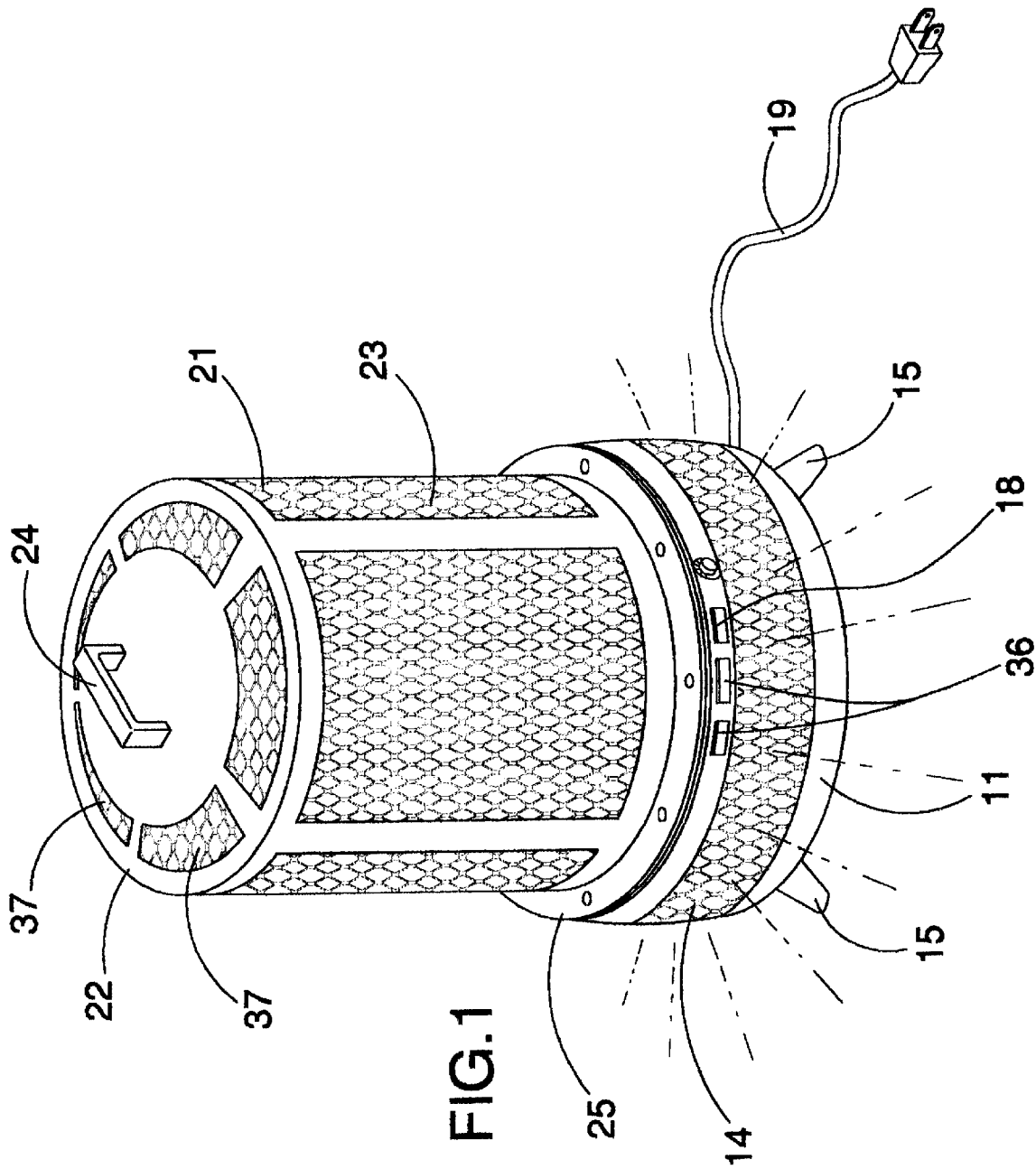
FIG. 1 is a perspective view of a new portable blower heater/cooler apparatus according to the present invention.
Figure 2:
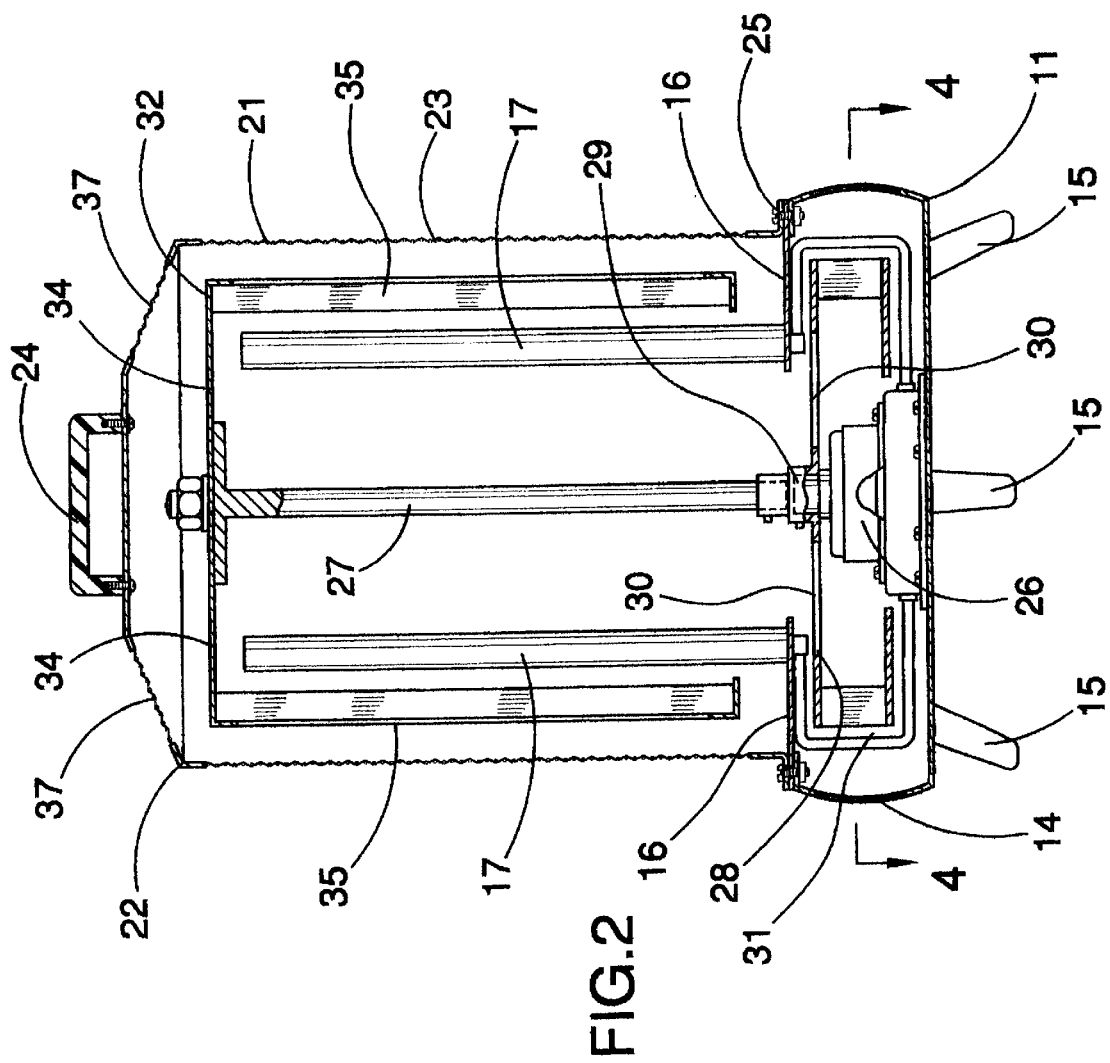
FIG. 2 is a cross-sectional view of the present invention.
Figure 3:
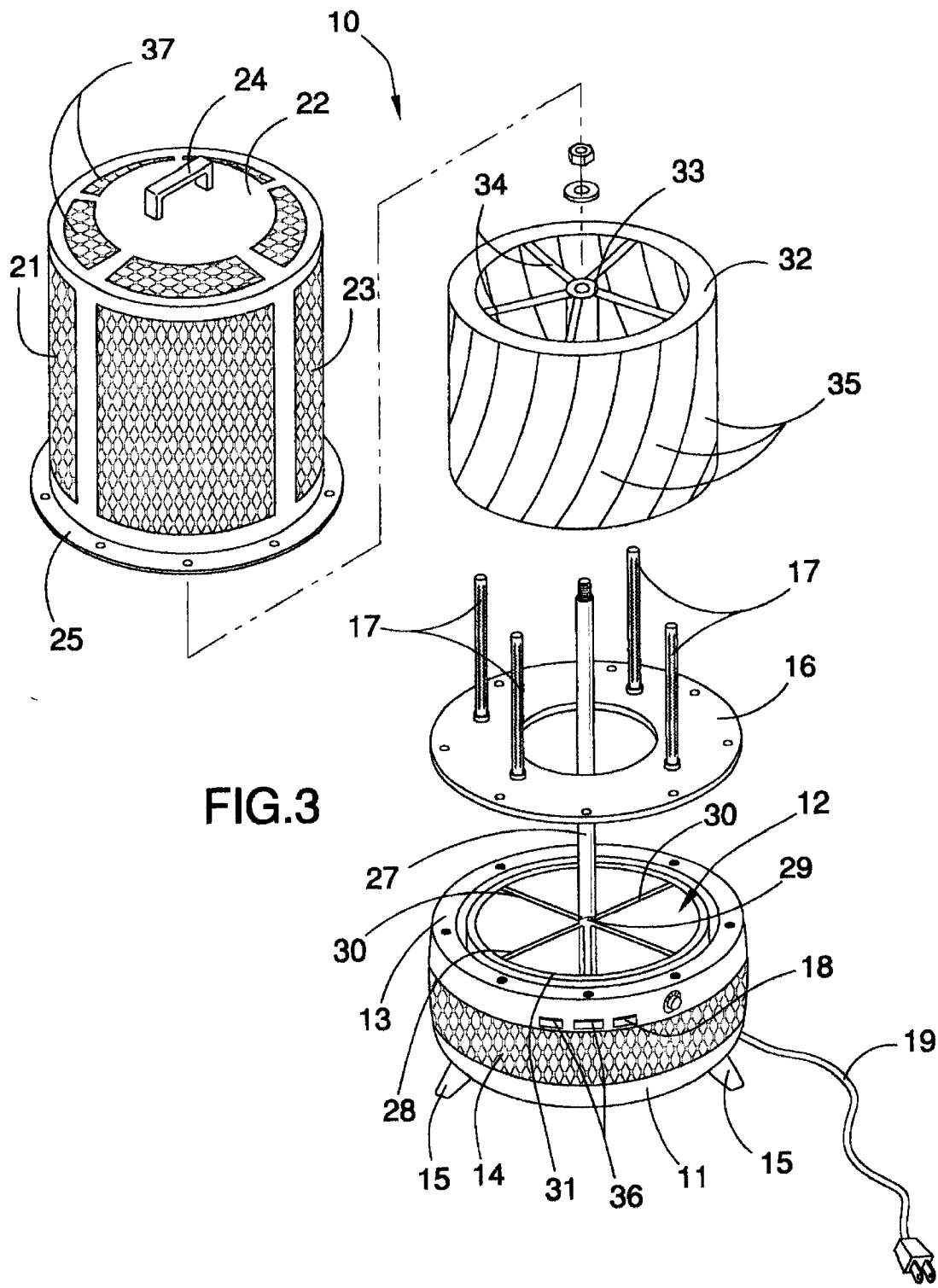
FIG. 3 is an exploded perspective view of the present invention.
Figure 4:
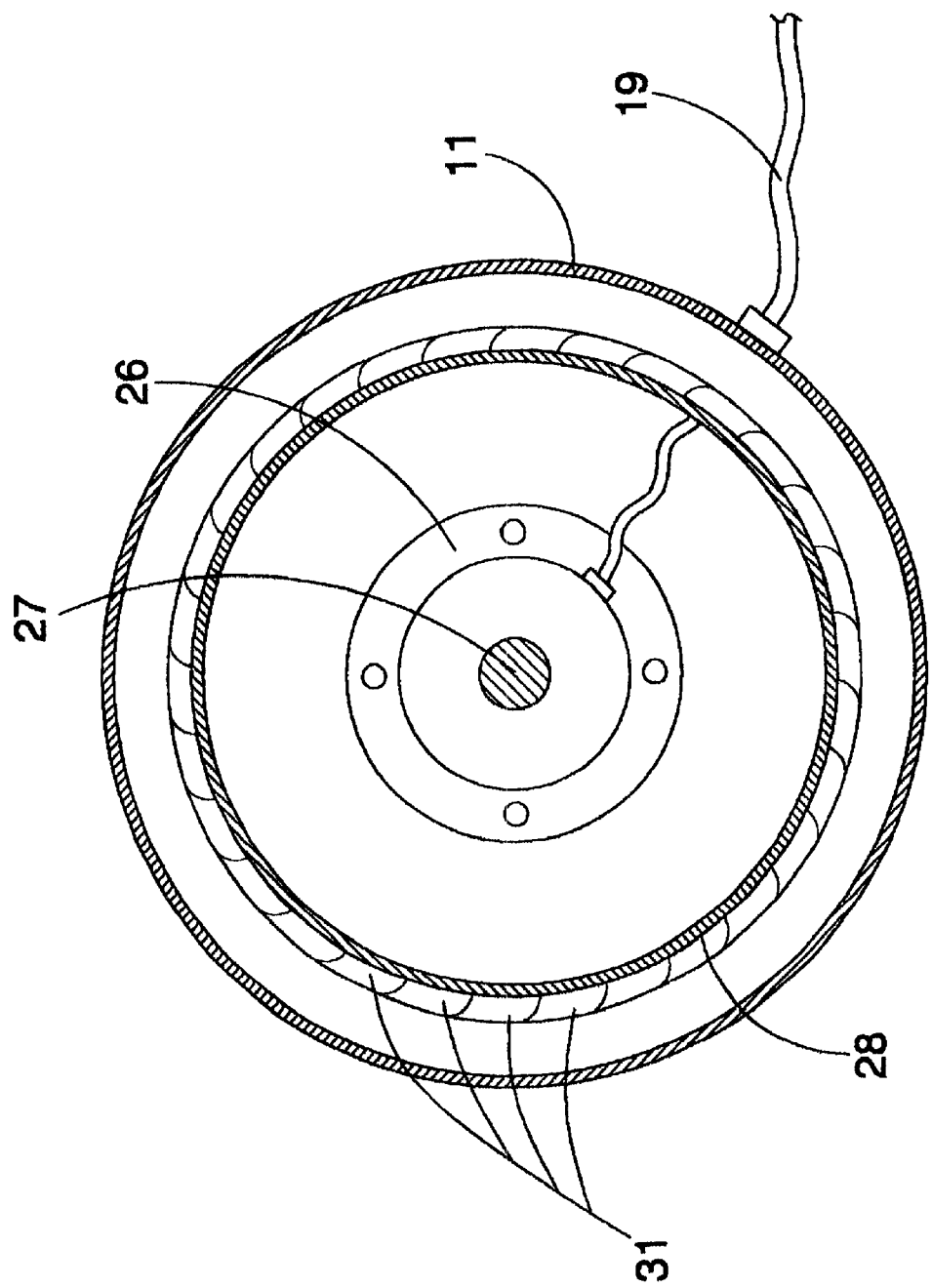
FIG. 4 is a cross-sectional view of the base housing of the present invention.
Figure 5:
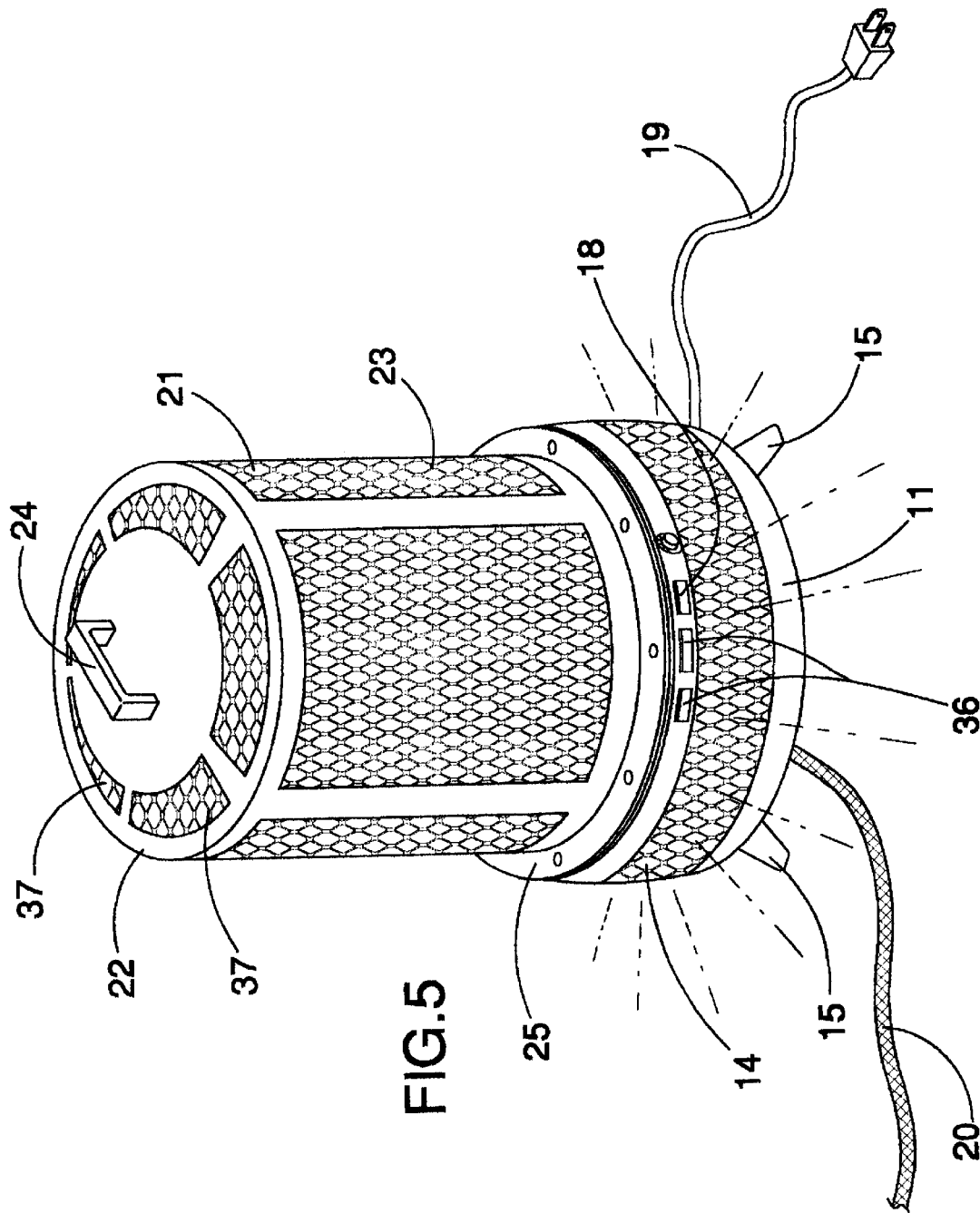
FIG. 5 is a perspective view of a second embodiment of the present invention.
Figure 6:
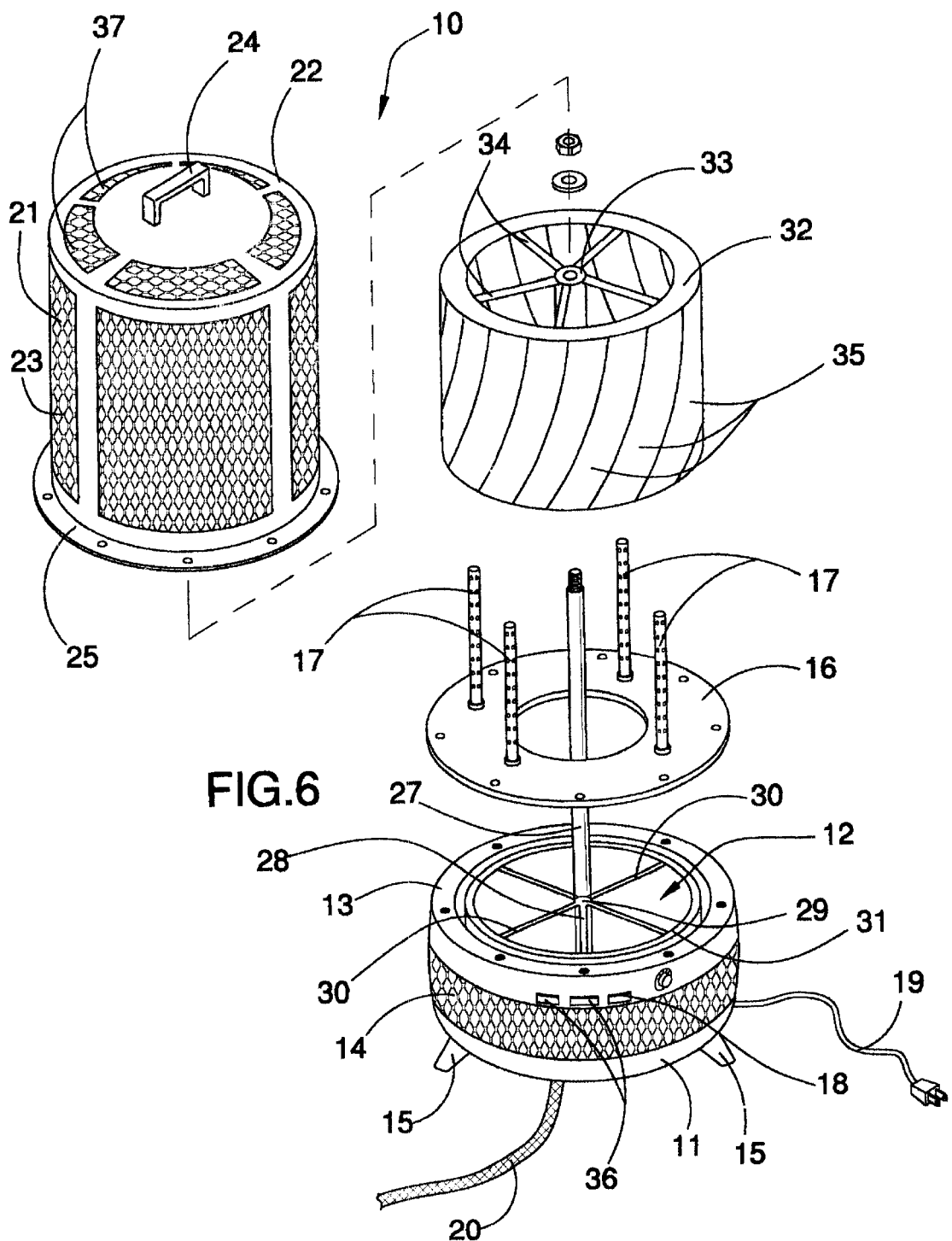
FIG. 6 is an exploded perspective view of the second embodiment of the present invention.

With reference now to the drawings, and in particular to FIGS. 1 through 6 thereof, a new portable blower heater/cooler apparatus embodying the principles and concepts of the present invention and generally designated by the reference numeral 10 will be described.

As best illustrated in FIGS. 1 through 6, the portable blower heater/cooler apparatus 10 generally comprises a base housing assembly including a base housing member 11 being mounted upon leg members 15 and having an opening 12 through a top thereof and also having a screen 14 forming a side of the base housing member 11. The base housing member 11 also includes a rim 13 being disposed about the opening thereof and having a plurality of holes being spaced therealong. The screen 14 is generally a mesh circular band.

A heater/cooler assembly includes a support plate 16 being fastenable over the opening 12 of the base housing member 11, and also includes a plurality of heating/cooling elements 17 being conventionally mounted upon the support plate 16. The heater/cooler assembly further includes a power switch 18 being conventionally mounted to the base housing member 11 and being connected to the heating/cooling elements 17 and to a power cord 19. The heating/cooling elements 17 are generally posts having ends that are securely and conventionally attached to the support plate 16, and are extended outwardly from the support plate 16. As a second embodiment, the heating/cooling elements 17 are elongate gas burners having ends that are securely and conventionally attached to the support plate 16, and are extended outwardly from the support plate 16 with the elongate gas burners being conventionally attached to a hose 20 for providing fuel to the elongate gas burners.

A cover 21 is fastenably mounted upon the base housing member 11 and over the heater/cooler assembly. The cover 21 includes top and side walls 22,23 and an open bottom, and also includes a handle 24 being conventionally attached to the top wall 22, and further includes a rim 25 being conventionally disposed about the open bottom thereof and having a plurality of holes being spaced therealong. The cover 21 also has strips of mesh 37 being spacedly and conventionally disposed in the top wall to allow heated air to flow therethrough. The cover further has sheets of mesh being spacedly and conventionally disposed in the side wall thereof.

A fan assembly includes a motor 26 being fastenably and conventionally disposed in the base housing member 11 and having an elongate shaft 27 rotatably and conventionally attached to the motor 26, and also includes impellers 28,32 being conventionally mounted to the elongate shaft 27 for creating flow of air through the screen 14 and sheets and strips of mesh 37. The fan assembly further includes switch members 36 being conventionally mounted upon the base housing member 11 and being conventionally connected to the motor 26 for controlling the speed thereof and being conventionally connected to the power cord 19 that is adapted to be plugged into an electrical outlet, and also includes a thermostat being conventionally attached to the base housing, member 11 and having a dial member for controlling the heating/cooling elements 17. The impellers 28,32 include a first impeller 28 being mounted upon the elongate shaft 27 of the motor 26 and being disposed in the base housing member 11, and also include a second impeller 32 also being conventionally mounted upon the elongate shaft 27 of the motor 26 above the base housing member 11. Each of the impellers 28,32 includes a tubular member 29,33, and also includes radial arms 30,34 being conventionally attached to the tubular member 29,33, and further includes vanes 31,35 being conventionally attached to the radial arms 30,34 and being arranged side-by-side in a circular pattern about the tubular member 29,33 and being adapted to create flow of air.

In use, the user turns on the motor 26 and the heating/cooling elements 17 using the power switch 18 and the switch members 36 which energizes the rotation of the first and second impellers 28,32 thus creating air which is heated by the heating/cooling elements 17 and which is forced through the screen 14 and the strips of mesh 37 outside the cover 21 and the base housing member 11.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the portable blower heater/cooler apparatus. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A portable blower heater/cooler apparatus comprising:
    a base housing assembly including a base housing member being mounted upon leg members and having an opening through a top thereof and also having a screen forming a side of said base housing member, said base housing member also including a rim being disposed about said opening thereof and having a plurality of holes being spaced therealong;
    a heater/cooler assembly including a support plate being fastenable over said opening of said base housing member, and also including a plurality of heating/cooling elements being mounted upon said support plate;
    a cover being fastenably mounted upon said base housing member and over said heater/cooler assembly, said cover including top and side walls and an open bottom, and also including a handle being attached to said top wall, and further including a rim being disposed about said open bottom thereof and having a plurality of holes being spaced therealong, and also including strips of mesh being spacedly disposed in said top wall, and further including sheets of mesh being disposed in said side wall thereof; and
    a fan assembly including a motor being fastenably disposed in said base housing member and having an elongate shaft rotatably attached to said motor, and also including impellers being mounted to said elongate shaft for creating flow of air through said screen and said cover.

2. A portable blower heater/cooler apparatus as described in claim 1, wherein said fan assembly further includes switch members being mounted upon said base housing member and being connected to said motor for controlling the speed thereof and being connected to a power cord which is adapted to be plugged into an electrical outlet, and also includes a thermostat being attached to said base housing member and having a dial member for controlling said heating/cooling elements.

3. A portable blower heater/cooler apparatus as described in claim 2, wherein said impellers include a first impeller being mounted upon said elongate shaft of said motor and being disposed in said base housing member, and also includes a second impeller also being mounted upon said elongate shaft of said motor above said base housing member.

4. A portable blower heater/cooler apparatus as described in claim 3, wherein each of said impellers includes a tubular member, and also includes radial arms being attached to said tubular member, and further includes vanes being attached to said radial arms and being arranged side-by-side in a circular pattern about said tubular member and being adapted to create air which is forced through said screen and said strips of mesh.

5. A portable blower heater/cooler apparatus as described in claim 4, wherein said heater/cooler assembly further includes a power switch being mounted to said base housing member and being connected to said heating/cooling elements and to said power cord.

6. A portable blower heater/cooler apparatus as described in claim 5, wherein said heating/cooling elements are generally posts having ends which are securely attached to said support plate, and being extended outwardly from said support plate.

7. A portable blower heater/cooler apparatus as described in claim 5, wherein said heating/cooling elements are elongate gas burners having ends which are securely attached to said support plate, and being extended outwardly from said support plate, said elongate gas burners being attached to a hose for providing fuel to said elongate gas burners.

* * * * *